(12) United States Patent
Liu

(10) Patent No.: US 7,864,449 B2
(45) Date of Patent: Jan. 4, 2011

(54) NEGATIVE REFRACTION PHOTONIC CRYSTAL LENS

(75) Inventor: Cheng-Yang Liu, Taichung (TW)

(73) Assignee: Industrial Technology Research Institute, Hsinchu (TW)

( * ) Notice: Subject to any disclaimer, the term of this patent is extended or adjusted under 35 U.S.C. 154(b) by 41 days.

(21) Appl. No.: 12/383,720

(22) Filed: Mar. 26, 2009

(65) Prior Publication Data

US 2010/0165482 A1 Jul. 1, 2010

(30) Foreign Application Priority Data

Dec. 30, 2008 (TW) .............................. 97151428 A

(51) Int. Cl.
*G02B 1/00* (2006.01)
*G02B 3/12* (2006.01)
*G02B 6/122* (2006.01)

(52) U.S. Cl. .................. 359/722; 359/642; 385/129

(58) Field of Classification Search ................. 257/432; 343/909; 359/642, 652, 722; 385/129; 428/69
See application file for complete search history.

(56) References Cited

U.S. PATENT DOCUMENTS

| | | | |
|---|---|---|---|
| 6,999,669 B2 | 2/2006 | Summers et al. | |
| 7,058,242 B2 | 6/2006 | Lidorikis et al. | |
| 7,072,098 B2 | 7/2006 | Solli | |
| 7,177,513 B2 | 2/2007 | Povinelli et al. | |
| 7,283,716 B2 | 10/2007 | Park et al. | |
| 7,298,544 B2 | 11/2007 | Moon et al. | |
| 7,308,163 B2 | 12/2007 | Bratkovski et al. | |
| 7,352,941 B2 | 4/2008 | Bratkovski et al. | |
| 7,359,605 B2 | 4/2008 | Heitmann | |
| 7,359,606 B2 | 4/2008 | Ushida et al. | |
| 7,362,943 B2 | 4/2008 | Ouderkirk et al. | |
| 7,400,806 B2 | 7/2008 | Kim et al. | |
| 7,406,222 B2 | 7/2008 | Kornilovich | |
| 7,412,127 B2 | 8/2008 | Suh et al. | |
| 7,418,161 B2 | 8/2008 | Mouli | |
| 2007/0065068 A1* | 3/2007 | Wang ............................ | 385/8 |
| 2009/0040132 A1* | 2/2009 | Sridhar et al. ........... | 343/911 R |

FOREIGN PATENT DOCUMENTS

| | | |
|---|---|---|
| TW | 460718 | 10/2001 |
| TW | 552443 | 9/2003 |

(Continued)

*Primary Examiner*—David N Spector
(74) *Attorney, Agent, or Firm*—J.C. Patents

(57) ABSTRACT

A negative refraction photonic crystal lens is provided. The negative refraction photonic crystal lens includes a substrate and a plurality of voids periodically distributed in the substrate. The voids are configured extending along a direction longitudinally perpendicular with an incident direction of a light having a specific wavelength. By suitably selecting a refractive index of the substrate, a radius of the voids, and a lattice parameter of the voids, the negative refraction photonic crystal lens presents a negative refraction characteristic with respect to the specific wavelength, in that the light incident from one side of the substrate can be focused at the other side of the substrate, thus configuring an optical lens. The optical lens is adapted for not only achieving an optimal sub-wavelength focusing performance, but also further improving the imaging resolution of the negative refraction photonic crystal lens by employing an anisotropic material for preparing the substrate.

16 Claims, 6 Drawing Sheets

FOREIGN PATENT DOCUMENTS

| TW | 200500665 | 1/2005 |
| TW | I243918 | 11/2005 |
| TW | 200615513 | 5/2006 |
| TW | 200624893 | 7/2006 |
| TW | I287648 | 10/2007 |
| TW | I289214 | 11/2007 |
| TW | 200819800 | 5/2008 |

* cited by examiner

NEGATIVE REFRACTION PHOTONIC CRYSTAL LENS

CROSS-REFERENCE TO RELATED APPLICATION

This application claims the priority benefit of Taiwan application serial no. 97151428, filed on Dec. 30, 2008. The entirety of the above-mentioned patent application is hereby incorporated by reference herein and made a part of this specification.

BACKGROUND OF THE INVENTION

1. Field of the Invention

The present invention relates to a negative refraction photonic crystal lens designed in accordance with the negative refraction characteristic of a photonic crystal structure.

2. Description of Related Art

In accordance with the progresses of high-tech industries and for the purpose of improving efficiencies and qualities of products, processes for fabricating the products are developed toward miniaturization. For example, all of the 30 nm and 45 nm linewidth processing of the semiconductor industry, tiny defects on the panel surface of the flat panel display (FPD) industry, and surface defects of the precision optical element industry should be inspected. Correspondingly, small inspection equipment having a high resolution is highly demanded. During the fabrication processes of the products, even very tiny processing defects or contaminants may seriously destroy the yield and performance of the products. Particularly, very low defect density may negatively affect subsequent processing stages and cause incurable damage to the quality of an epitaxial wafer or an FPD substrate.

There are different kinds of defect inspection tools provided in the market. However, they are often expansive, complex in operation, and occupy large spaces. These defect inspection tools usually have relatively low resolutions which are insufficient for complying with the requirement for nano-scale inspection and online instant inspection. Specifically, for example, with respect to the optical inspection technology for inspecting a surface of an object, an optical lens is often a critical component. However, the current optical lenses are often featured with unsatisfactory imaging performances and insufficient optical resolutions.

SUMMARY OF THE INVENTION

Accordingly, the present invention is directed to provide a negative refractive photonic crystal lens, adapted for optimally imaging and achieving a sub-wavelength focusing performance.

The present invention is further directed to provide a negative refractive photonic crystal lens, adapted for improving an imaging resolution thereof up to $0.349\lambda$, wherein $\lambda$ is the wavelength of a measuring light. Such a negative refractive photonic crystal lens is an optical lens having the highest imaging resolution at present.

The present invention provides a negative refraction photonic crystal lens. The negative refraction photonic crystal lens includes a substrate having a plurality of voids periodically distributed in the substrate. The voids are configured longitudinally extending along a direction perpendicular with an incident direction of a light having a specific wavelength. By selecting a refractive index of the substrate, a radius of the voids, and a lattice parameter of the voids, the negative refraction photonic crystal lens presents a negative refraction characteristic with respect to the specific wavelength, in that the light incident from one side of the substrate can be focused at the other side of the substrate, thus configuring an optical lens.

The present invention further provides a negative refraction photonic crystal lens. The negative refraction photonic crystal lens includes an anisotropic substrate in which a plurality of voids is periodically distributed. The voids are configured longitudinally extending along a direction perpendicular with an incident direction of a light having a specific wavelength. By selecting a refractive index of the anisotropic substrate, a radius of the voids, and a lattice parameter of the voids, the negative refraction photonic crystal lens presents a negative refraction characteristic with respect to the specific wavelength, in that the light incident from one side of the anisotropic substrate can be focused at the other side of the anisotropic substrate, thus configuring an optical lens.

Accordingly, the present invention provides an optical lens designed in accordance with the negative refraction characteristic of a photonic crystal structure. The negative refraction photonic crystal lens is adapted for optimally imaging and achieving a sub-wavelength focusing performance, i.e., achieving a high resolution up to $0.419\lambda$, wherein $\lambda$ is the wavelength of a measuring light. Further, when an anisotropic material is used for preparing the substrate, the imaging resolution can be further improved to $0.349\lambda$, thus achieving an optical lens having currently the highest imaging resolution.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
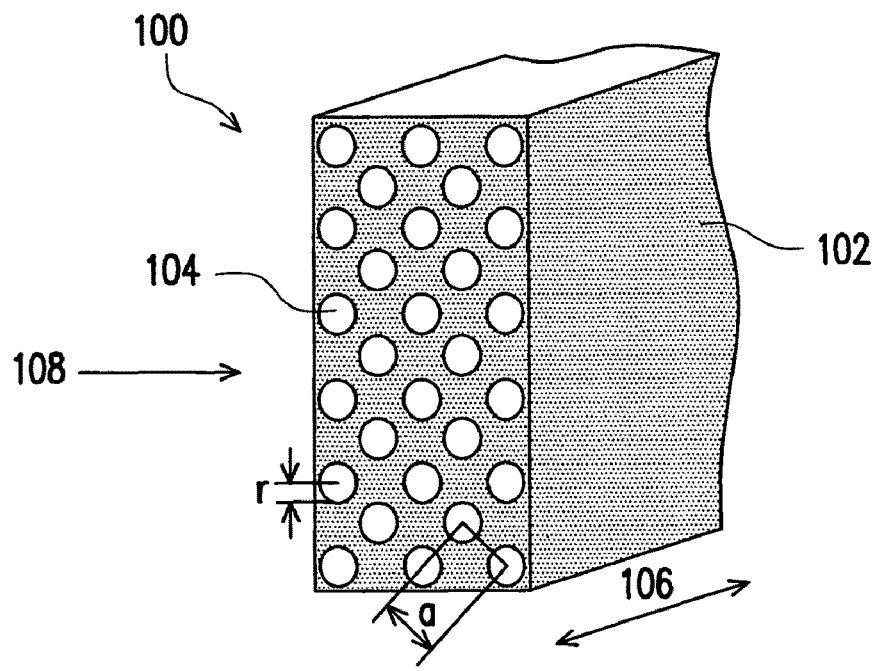
FIG. 1 is a cross-sectional view of a negative refraction photonic crystal lens according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Photonic crystal is also known as a periodic structure. The discovery of the photonic crystal raises many novel theoretical and experimental research subjects. For example, a photonic structure is periodically arranged in an electromagnetic wavelength scale. An electromagnetic wave transmitted in such a photonic structure will be affected by the arrangement period, the spatial structure, and the dielectric constant of the medium. As such, the optical waveguide characteristic of the photonic structure can be designed as expected in the electromagnetic wavelength scale. In accordance with photonic energy band and the dispersion relationship between the photonic frequency and the wave vector, the light emitting efficiency and transmission can be more effectively controlled. As such, the photonic crystal can be used for designing different kinds of micro optical elements.

FIG. 1 is a cross-sectional view of a negative refraction photonic crystal lens according to an embodiment of the present invention.

Referring to FIG. 1, a negative refraction photonic crystal lens 100 is shown. The negative refraction photonic crystal lens 100 is composed of a substrate 102, and a plurality of voids 104 periodically distributed in the substrate 102. The voids 104 are distributed in a manner of square lattice. The voids 104 for example contain air only, or are vacuumed. The voids 104 can also be filled with other materials such as water or polymer. The voids 104 are configured longitudinally extending along a direction 106 perpendicular with an incident direction of a light 108. The light 108 has a specific wavelength. The negative refraction photonic crystal lens 100 can achieve the desired negative refraction characteristic with respect to the specific wavelength by varying at least one of a refractive index of the material of the substrate 102, a radius r of the voids 104, and a lattice parameter a of the voids. For example, the material of the substrate 102 has the refractive index ranging from 3 to 7, such as silicon, metal, or an anisotropic material (e.g., tellurium; Te). The light 108 incident from one side of the substrate 102 can be focused at the other side of the substrate 102. Therefore, an optical lens is configured.

A plane wave expansion method can be used for calculating a dispersion curve and an equal frequency diagram of the negative refraction photonic crystal lens of the present invention. Therefore, the refractive direction and a relative frequency which equivalent frequency is −1 can be predicted, and subsequently simulated for verification with a finite-difference time-domain (FDTD) method.

In accordance with the long-wavelength limit principle, when the lattice parameter is much smaller than the wavelength of the light (usually 1/10), the crystal having such a lattice can be considered as a uniform equivalent medium. The equal frequency diagram of such a crystal is an orthogonal circle as that of an ordinary isotropy material. In this case, the relationship between incident angle and refractive angle can be calculated in accordance with the Snell's law. However, when the wavelength of the light and the lattice parameter are approximately in same scale, the special Snell's law does not apply, and the general Snell's law applies, in that the wave vectors of the incident wave and refractive wave must be conserved at the interface.

Figure 2:
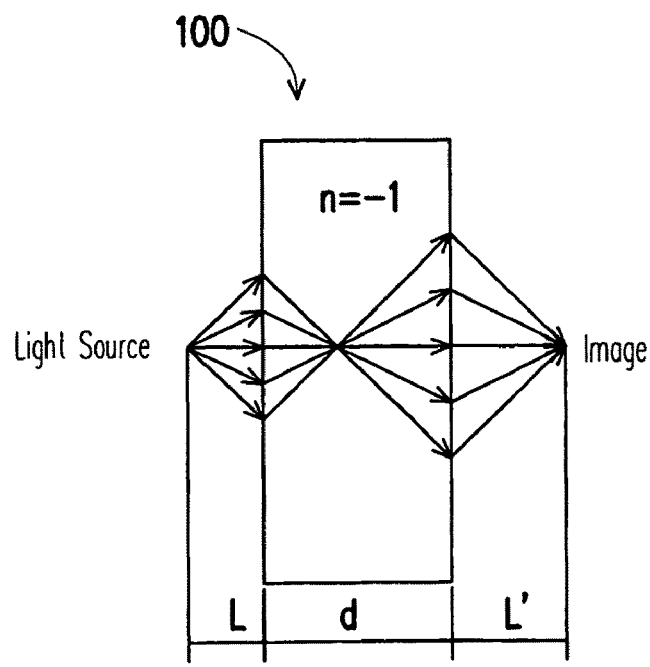
FIG. 2 is a schematic diagram illustrating imaging of the negative refraction photonic crystal lens of FIG. 1.

After the equivalent refractive index (n=−1) of the negative photonic crystal lens 100 is calculated, refractive directions are determined according to the Snell's law. It can be learnt from FIG. 2, after passing through the negative refractive photonic crystal lens 100, a light emitted from a point light source can generate an imaging point at an opposite side of the negative refractive photonic crystal lens 100. The imaging relationship is governed by an equation, L+L'=d, in which L represents a distance from the point light source to the left end of the negative refractive photonic crystal lens 100, L' represents a distance from the right end of the negative refractive photonic crystal lens 100 to the imaging point, and d represents a thickness of the negative refractive photonic crystal lens 100.

Figure 3:
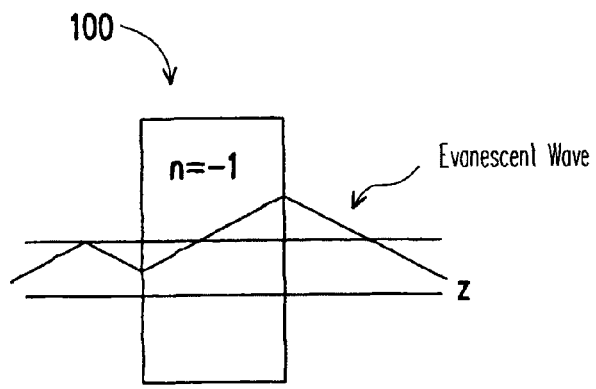
FIG. 3 is a schematic diagram illustrating the intensity variation of an electromagnetic evanescent wave of the negative refraction photonic crystal lens of FIG. 1.

The optical imaging resolution is determined by the intensity of the electromagnetic evanescent wave. FIG. 3 is a schematic diagram illustrating the intensity variation of an electromagnetic evanescent wave of the negative refraction photonic crystal lens of FIG. 1. Referring to FIG. 3, when the light emitted from the point light source is transmitted through the negative refraction photonic crystal lens 100 from the left side thereof, the evanescent wave of the light is amplified, so that after being focused at the imaging point at the right side of the negative refraction photonic crystal lens 100, the electromagnetic wave (i.e., the light) recovers back to a previous intensity. Meanwhile, the resolution of the negative refraction photonic crystal lens 100 is also much improved, thus achieving a sub-wavelength imaging, i.e., the resolution of the negative refraction photonic crystal lens 100 can achieve a scale less than a half of the wavelength of the light.

Figure 4:
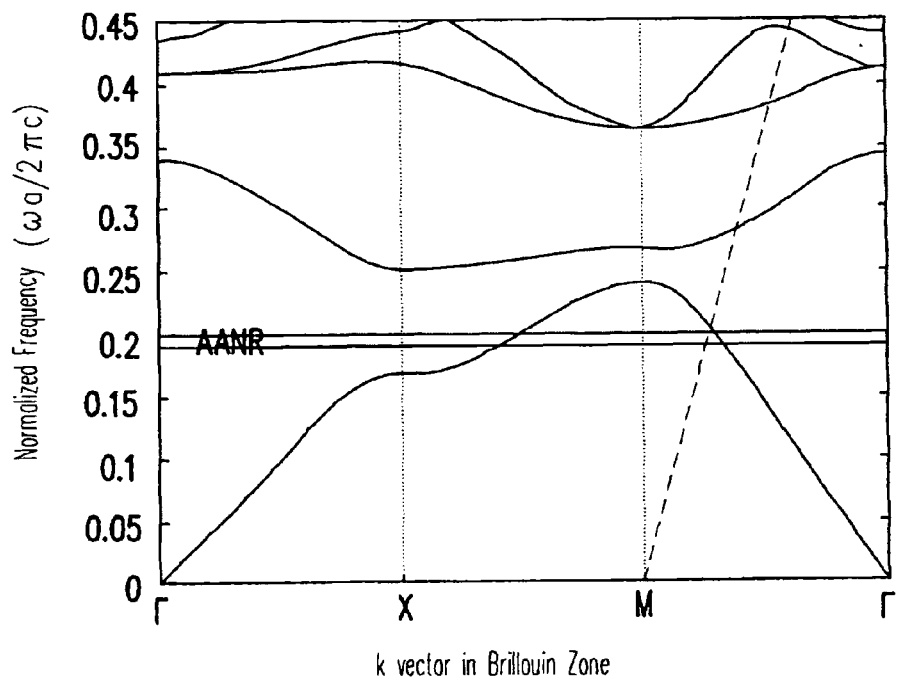
FIG. 4 is a dispersion curve of a negative refraction photonic crystal lens composed of silicon and voids filled with air.

Assuming that the voids 104 are filled with air and are distributed in a manner of square lattice, and the substrate 102 is made of silicon, the dielectric constant "∈" of the substrate 102 is 12, and radius "r" of the voids 104 is 0.35a, in which "a" represents the lattice parameter. The radius of the voids 104 ranges from 50 nm to 300 nm, and the lattice parameter of the voids ranges from 110 nm to 600 nm. The imaging mechanism of the negative refraction photonic crystal lens 100 is determined by the area of an all angle negative refraction (AANR), as shown in FIG. 4. FIG. 4 is a dispersion curve of a negative refraction photonic crystal lens composed of silicon and voids filled with air. In order to find out a relative frequency of the AANR, a dispersion curve of the light transmitting in the air is provided in FIG. 4, that is the black dashed line at the MΓ direction. The point of the intersection of the dispersion curve with a first energy band indicates the highest relative frequency of the AANR. In this case, the normalized frequency, ω=a/λ=0.2, and the minimum value of the normalized frequency can be determined by a relative frequency of the equal frequency diagram turning from peak to flat, i.e., ω=0.19.

Figure 5:
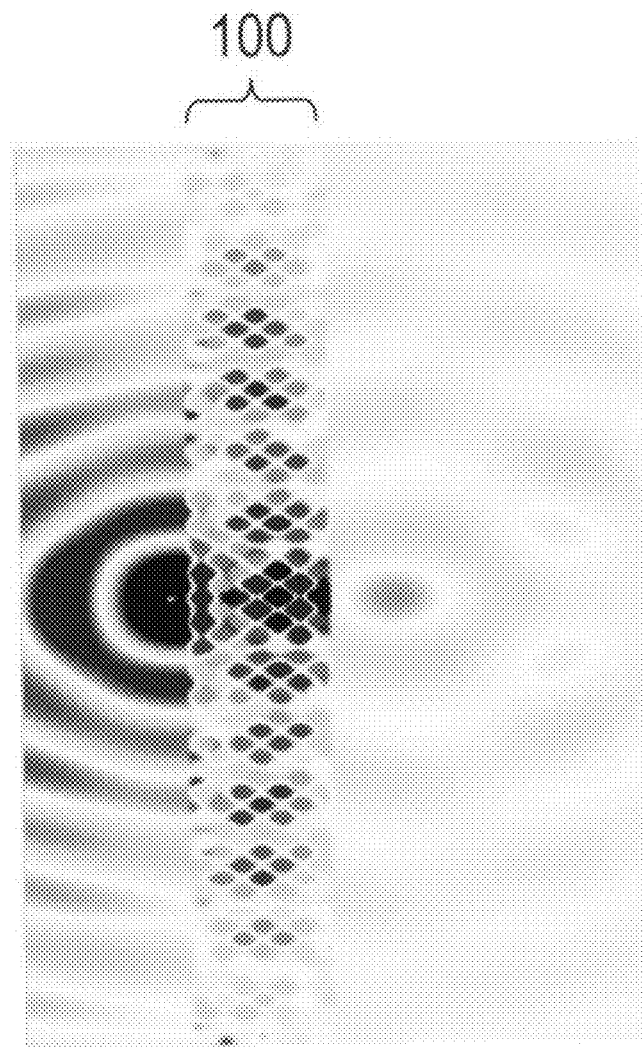
FIG. 5 illustrates the magnetic field of the negative refraction photonic crystal lens of FIG. 4.

For verifying the optimal imaging performance of the negative refraction photonic crystal lens 100, a point light source is a positioned a one lattice parameter (i.e., 1a) distance away from the left end of the negative refraction photonic crystal lens 100, while the incident normalized frequency ω=a/λ=0.2. A simulated magnetic field result is shown in FIG. 5. Referring to FIG. 5, it can be learnt that there is apparently a focusing image generated at the right side of the negative refraction photonic crystal lens 100, thus achieving an optimal imaging performance. The resolution thereof can be up to 0.419λ, wherein λ represents the wavelength of a measuring light.

Further, in order to achieve a higher optical resolution, the negative refraction photonic crystal lens 100 can also employ an anisotropic material for preparing the substrate 102. For example, tellurium (Te) is an anisotropic material having refractive indices at two directions, which are $n_e$=6.2 and $n_o$=4.8, respectively. The voids 104 for example have a radius ranging from 20 nm to 300 nm, and the lattice parameter ranges from 50 nm to 400 nm.

Figure 6:
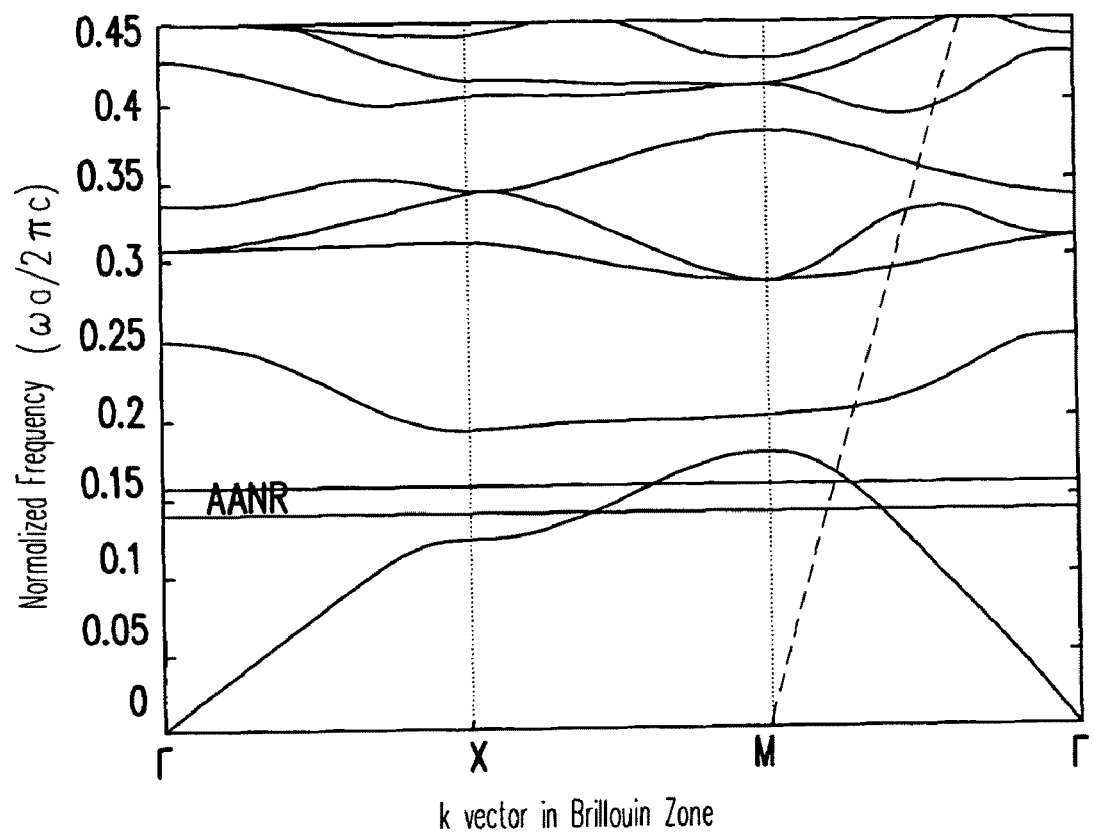
FIG. 6 is a dispersion curve of a negative refraction photonic crystal lens composed of an anisotropic material (i.e. Te) and air voids.

FIG. 6 is a dispersion curve of a negative refraction photonic crystal lens composed of an anisotropic material (Te) and air voids. Referring to FIG. 6, it can be learnt that the negative refraction frequency ω=0.1594.

Figure 7:
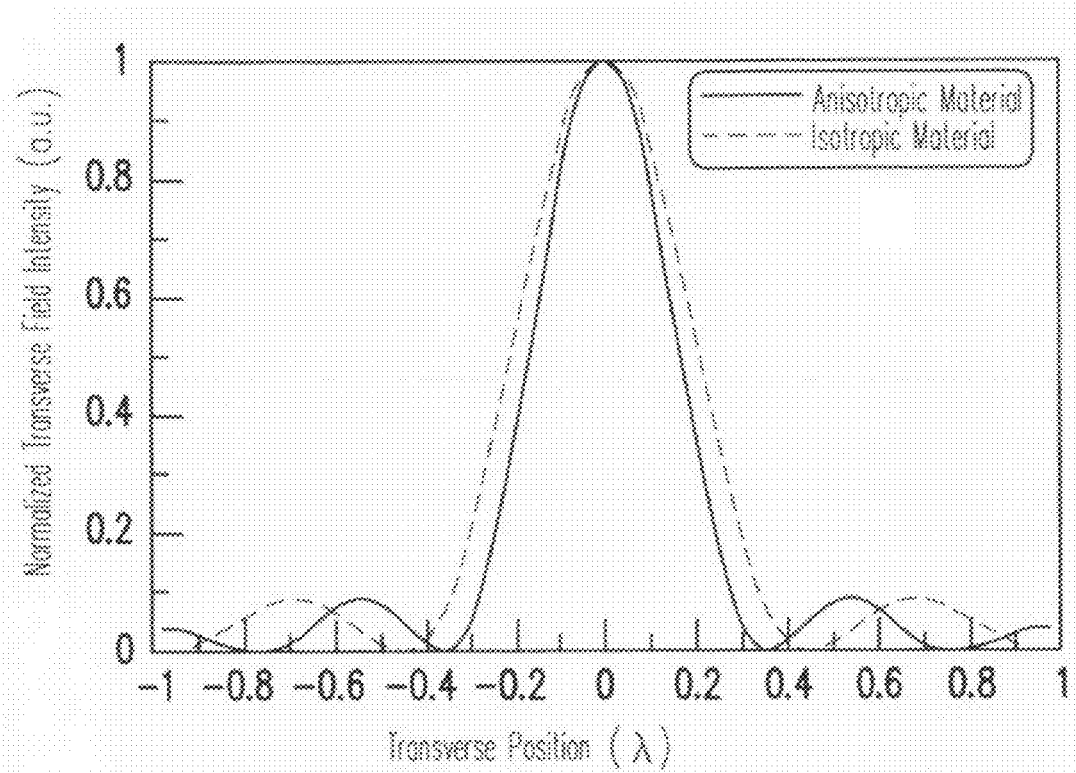
FIG. 7 is a half-height full-width diagram of a focus point of the negative refraction photonic crystal lens of FIG. 6.

For verifying that the anisotropic material can be employed for preparing the substrate 102 for achieving an improved optical resolution, the half-height full-width of the focus point is used for comparison. FIG. 7 is a half-height full-width diagram of a focus point of the negative refraction photonic crystal lens of FIG. 6, in which the isotropic substrate is described by the dashed line, and the isotropic substrate is described by the solid line. It can be learnt from FIG. 7 that the half-height full-width of the negative refraction photonic crystal lens employing the anisotropic substrate achieves up to 0.349λ. As such, the anisotropic substrate is adapted of effectively improving the optical resolution of the lens.

Figure 8:
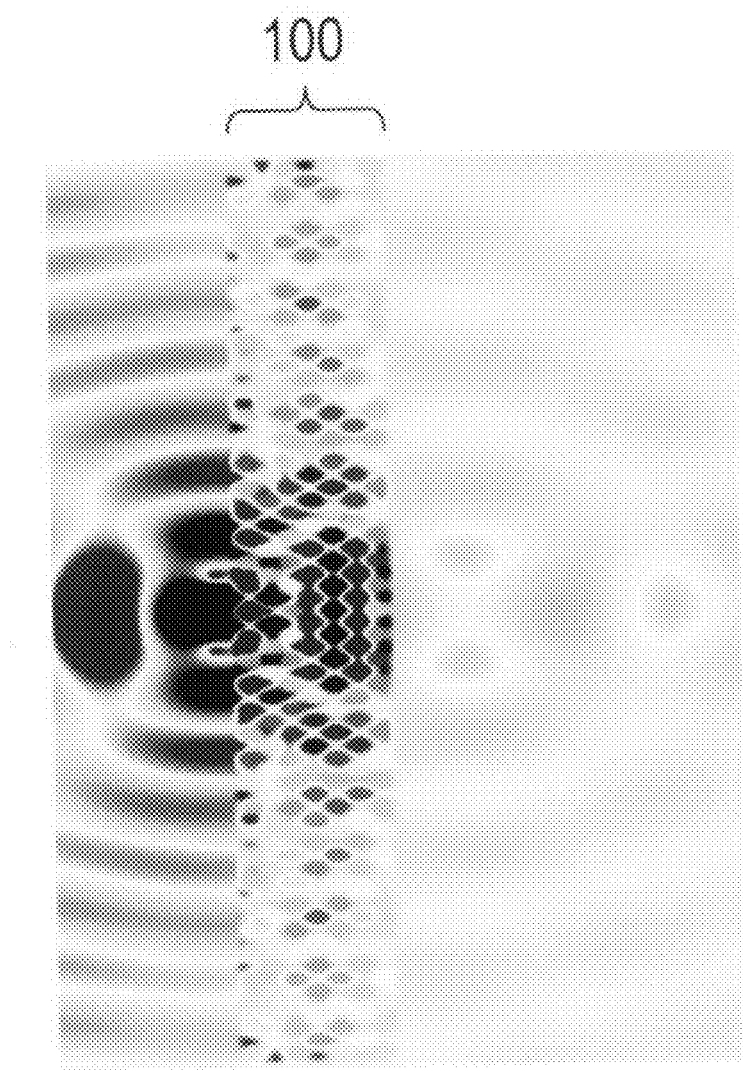
FIG. 8 illustrates the magnetic field of the negative refraction photonic crystal lens of FIG. 6.

For testing the imaging capability of the negative refraction photonic crystal lens of the present invention, two point light sources are provided for simulation. FIG. 8 is a diagram simulating the magnetic field of the negative refraction photonic crystal lens of FIG. 6. Referring to FIG. 8, two point light sources are provides at the left side of the negative refraction photonic crystal lens. It can be learnt from the simulation that two focused light points are formed at the right side of the negative refraction photonic crystal lens. As such, the negative refraction photonic crystal lens is proved to have an optimal resolution capability.

In summary, the present invention provides an optical lens designed in accordance with the negative refraction characteristic of a photonic crystal structure. The photonic crystal structure is featured with a periodically varied dielectric parameter distributed therein. Therefore, the photonic crystal structure has a unique dispersion characteristic in the light transmission area thereof. As such, the present invention configures voids periodically distributed in a substrate, thus obtaining a negative refraction characteristic. In accordance with such a structure, an optical lens is designed, thus obtaining an optical lens having an optimal imaging resolution and achieving an optimal sub-wavelength focusing performance. Further, the present invention employs anisotropic material for preparing the substrate, thus further improving the achieved sub-wavelength focusing performance, and further improving the imaging resolution of the negative refraction photonic crystal lens.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A negative refraction photonic crystal lens, comprising:
    a substrate having a plurality of voids periodically distributed in the substrate, wherein the voids are filled with water or polymer and
    the voids are configured longitudinally extending along a direction perpendicular with an incident direction of a light having a specific wavelength, and
    by selecting a refractive index of the substrate, a radius of the voids, and a lattice parameter of the voids, the negative refraction photonic crystal lens presents a negative refraction characteristic with respect to the specific wavelength, so that the light incident from one side of the substrate is focused at another side of the substrate, thus configuring an optical lens.

2. The negative refraction photonic crystal lens according to claim 1, wherein the voids are distributed in a manner of square lattice.

3. The negative refraction photonic crystal lens according to claim 1, wherein the refractive index of the substrate is from 3 to 7.

4. The negative refraction photonic crystal lens according to claim 1, wherein a material of the substrate comprises metal.

5. The negative refraction photonic crystal lens according to claim 1, wherein at least one of the material of the substrate, the radius of the voids, and the lattice parameter of the voids is variable for achieving a negative refraction frequency.

6. The negative refraction photonic crystal lens according to claim 1, wherein a material of the substrate comprises silicon.

7. The negative refraction photonic crystal lens according to claim 6, wherein the radius of the voids ranges from 50 nm to 300 nm.

8. The negative refraction photonic crystal lens according to claim 6, wherein the lattice parameter of the voids ranges from 100 nm to 600 nm.

9. A negative refraction photonic crystal lens, comprising:
    an anisotropic substrate having a plurality of voids periodically distributed in the anisotropic substrate, wherein the voids are distributed in a manner of square lattice and
    the voids are configured longitudinally extending along a direction perpendicular with an incident direction of a light having a specific wavelength, and
    by selecting a refractive index of the anisotropic substrate, a radius of the voids, and a lattice parameter of the voids, the negative refraction photonic crystal lens presents a negative refraction characteristic with respect to the specific wavelength, so that the light incident from one side of the anisotropic substrate is focused at another side of the substrate, thus configuring an optical lens.

10. The negative refraction photonic crystal lens according to claim 9, wherein the refractive index of the anisotropic substrate is from 3 to 7.

11. The negative refraction photonic crystal lens according to claim 9, wherein the voids are filled with air or vacuumed.

12. The negative refraction photonic crystal lens according to claim 9, wherein the voids are filled with water or polymer.

13. The negative refraction photonic crystal lens according to claim 9, wherein at least one of the material of the substrate, the radius of the voids, and the lattice parameter of the voids is variable for achieving a negative refraction frequency.

14. The negative refraction photonic crystal lens according to claim 9, wherein a material of the anisotropic substrate comprises tellurium (Te).

15. The negative refraction photonic crystal lens according to claim 14, wherein the radius of the voids ranges from 20 nm to 300 nm.

16. The negative refraction photonic crystal lens according to claim 14, wherein the lattice parameter of the voids ranges from 50 nm to 400 nm.

* * * * *